Patented Aug. 11, 1931

1,818,935

UNITED STATES PATENT OFFICE

JAN TEPPEMA AND LORIN B. SEBRELL, OF AKRON, OHIO, ASSIGNORS TO THE GOODYEAR TIRE & RUBBER COMPANY, OF AKRON, OHIO, A CORPORATION OF OHIO

METHOD OF PREPARING THIAZOLES

No Drawing. Application filed November 26, 1928. Serial No. 322,080.

This invention relates to thiazoles or derivatives thereof, and it has particular relation to methods applicable to the preparation of those compounds.

One object of the invention is to provide a simple method of preparing thiazoles whereby the time required for the complete reaction of the basic ingredients is reduced to a minimum.

Another object of the invention is to provide a method of preparing such compounds which results in high yields of unusually pure product.

During recent years mercaptothiazoles and various derivatives thereof have become highly important as vulcanization accelerators in rubber compounds. One of the most important members of this class is mercaptobenzothiazole,

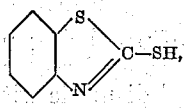

which was first described in an article by Hoffman in Berichte, 20, page 1788 (1887). According to the disclosure of this article, the compound is prepared by refluxing carbon bisulfide and ortho amino thiophenol together for a relatively long period of time.

This invention consists in the discovery that if carbon bisulfide is heated in the presence of freshly formed amino thiophenol, reaction takes place in a comparatively short period of time and a high yield of nearly pure mercaptothiazole is obtained. Freshly formed amino thiophenol may most conveniently be prepared by intermixing a derivative, such as a sodium salt of amino thiophenol and carbon bisulfide, and then subjecting the derivative to the action of a reducing agent, such as hydrogen sulfide. In this manner, the freshly formed compound is produced in the immediate presence of carbon bisulfide. The material, while freshly formed, is highly reactive and at once combines with the carbon bisulfide to form mercaptobenzothiazole.

Another convenient method of procedure consists in intermixing amino thiophenol and sodium hydroxide with water, the relative proportions of the ingredients being five grams of amino thiophenol, two grams of sodium hydroxide, and 50 cc. of water. Carbon dioxide which has been saturated with carbon disulfide is then bubbled through the mixture until the solution becomes neutral. The neutralized solution is next heated under a reflux condenser for a period of six hours. Upon acidification, practically pure mercaptobenzothiazole is precipitated. The yields obtained are almost quantitative. The reaction for the production of the freshly formed amino thiophenol may be represented as follows:

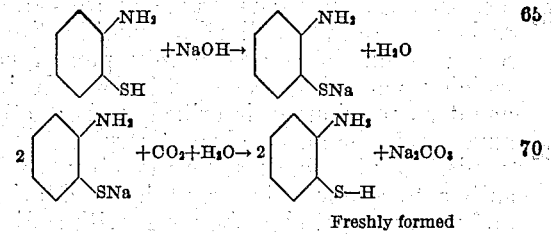

Freshly formed

Freshly formed amino thiophenol may also be obtained by treating salts, such as the sodium, potassium or ammonium salts of amido thiophenol, with such reducing agents as hydrogen sulfide, or with an acid, such as hydrochloric or sulphuric acid. The reactions taking place may be represented as follows:

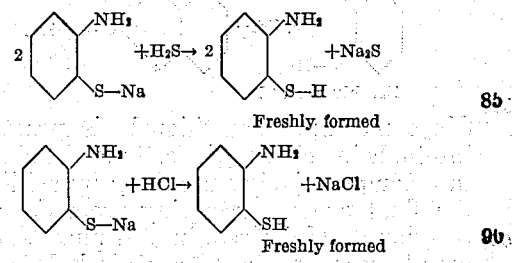

Freshly formed

Freshly formed

The invention is not limited to the use of alkaline salts of amino thiophenol for the preparation of freshly formed amino thiophenol, but may be practiced with various other derivatives of that compound. An excellent method consists in treating diortho diamino diphenyl disulfide with a reducing agent, such as hydrogen sulfide or sodium hydrosulfide. This treatment results in the splitting of the disulfide molecule and the production of two molecules of amino thiophenol in freshly formed state, the reaction proceeding as represented by the following equation:

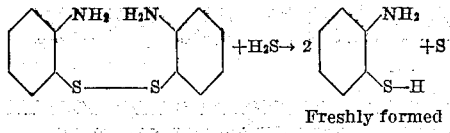

Freshly formed

To manufacture diortho diamino diphenyl disulfide, aniline and sulphur are mixed in the ratio of 224 grams of aniline and 140 grams of sulphur. This mixture is heated to a temperature of 160° to 180° C. under a reflux condenser for a period of eight to fifteen hours. The resulting material, consisting of a syrupy or tarry mass, is then subjected to steam distillation, in order to removed any volatile constituents. The mass is next extracted with concentrated acid (preferably hydrochloric). The disulfide compound is thus obtained in the solute as an acid salt having the formula:

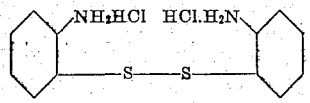

The salt, upon being neutralized with sodium carbonate, produces diortho diamido diphenyl disulfide in comparatively pure form, which upon being treated with a reducing agent as previously described, yields active amino thiophenol. Substantially the same results may be obtained by reducing the disulfide to amino thiophenyl hydrochloride, and then neutralizing the latter with sodium carbonate or an equivalent material.

In each of the above cases, if the active amino thiophenol is refluxed in the presence of carbon disulfide, reaction takes place within a relativtly short period of time to form mercaptobenzothiazole. This reaction may be represented as follows:

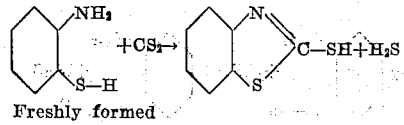

Freshly formed

Since mercaptobenzothiazole is practically insoluble in acid solutions, it may be obtained in a comparatively pure form by acidifying the final product resulting from the above reactions. If desired, in still purer form, it may be recrystallized from alcohol.

One of the primary advantages of the applicants' invention consists in the material reduction of the time required for the preparation of mercaptobenzothiazole. For example, according to the method described by Hoffmann, twenty four hours was required for complete reaction. Moffmann does not state the percent yields obtained by his method, but the applicants have found by actual trial of the method that the yields are low. According to the method constituting this invention, the time required for the production of mercaptobenzothiazole from the salts of amino thiophenol is reduced to six hours, and the yields obtained are almost quantitative.

Although we have described in detail only the preferred embodiments of the invention, it will be apparent to those skilled in the art that it is not so limited, but that various modifications may be made therein without departing from the spirit of the invention or frome the scope of the appended claims.

What we claim is:

1. A method of producing mercaptobenbothiazoles which comprises subjecting an alkali salt of amino thiophenol simultaneously to the action of carbon dioxide and carbon bisulfide.

2. A method of preparing mercaptobenzothiazoles which comprises treating an alkali salt of amino thiophenol with carbon dioxide saturated with carbon bisulfide.

3. A method of producing mercaptobenzothiazoles which comprises transforming a salt of amino thiophenol into amino thiophenol and immediately subjecting it to the action of carbon bisulfide while it is still highly reactive.

4. A method or producing mercaptobenzothiazole which comprises treating an alkali salt of amino thiophenol with an acid to produce freshly formed amino thiophenol in the presence of carbon bisulfide.

5. A method of producing mercaptobenzothiazoles which comprises treating diortho diamino diphenyl disulfide with acid to produce freshly formed amino thiophenol in the presence of carbon bisulfide.

In witness whereof, we have hereunto signed our names.

Signed at Akron, in the county of Summit and State of Ohio, U. S. A., this 23rd day of November, 1928.

JAN TEPPEMA.
LORIN B. SEBRELL.